No. 639,943. Patented Dec. 26, 1899.
J. C. SCHLEICHER.
BICYCLE CONNECTING FRAME.
(Application filed June 15, 1897.)
(No Model.)

WITNESSES:
S. J. Cox Jr.
N. H. Berry.

INVENTOR
John C. Schleicher
BY
Stephen J. Cox
ATTORNEY

THE NORRIS PETERS CO., PHOTO-LITHO., WASHINGTON, D. C.

UNITED STATES PATENT OFFICE.

JOHN C. SCHLEICHER, OF MOUNT VERNON, NEW YORK, ASSIGNOR OF ONE-HALF TO JOSEPH A. BRITTON, OF NEW YORK, N. Y.

BICYCLE-CONNECTING FRAME.

SPECIFICATION forming part of Letters Patent No. 639,943, dated December 26, 1899.

Application filed June 15, 1897. Serial No. 640,858. (No model.)

*To all whom it may concern:*

Be it known that I, JOHN C. SCHLEICHER, a citizen of the United States, residing at Mount Vernon, county of Westchester, State of New York, have invented a new and useful Improvement in Bicycle-Connecting Frames, of which the following is a full, clear, and true description, enabling others skilled in the art to which it pertains to make the same.

My invention relates to bicycle-connecting frames such as are used to link two bicycles together; and its objects, among others, are to provide means whereby two bicycles may be secured together in such manner that the uneven jolt of one bicycle is not communicated to the other, but is taken up and absorbed by the connecting-frames; and to these ends it consists of the combination of parts and arrangement of details hereinafter described and claimed, and illustrated in the accompanying drawings, in which like letters refer to like parts in each figure thereof.

Figure 2:
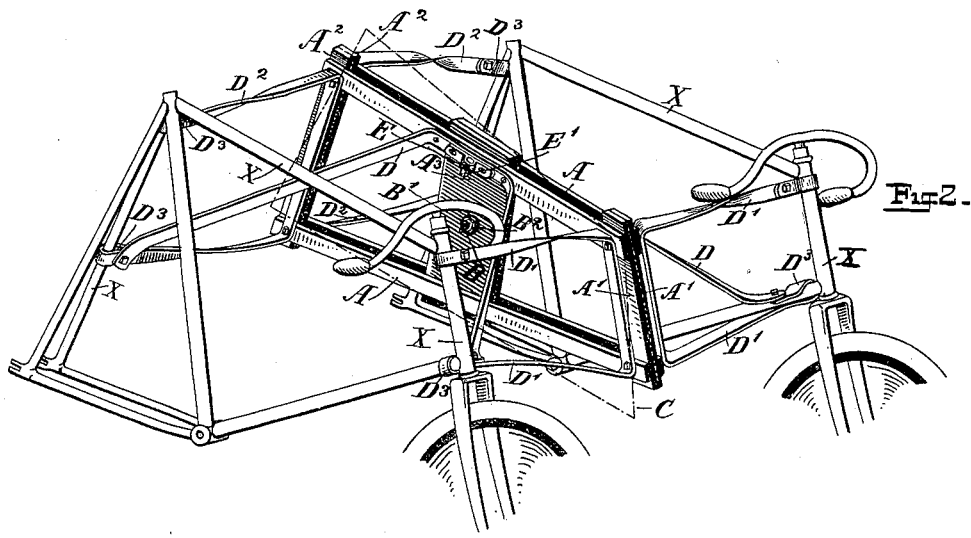
Figure 1:
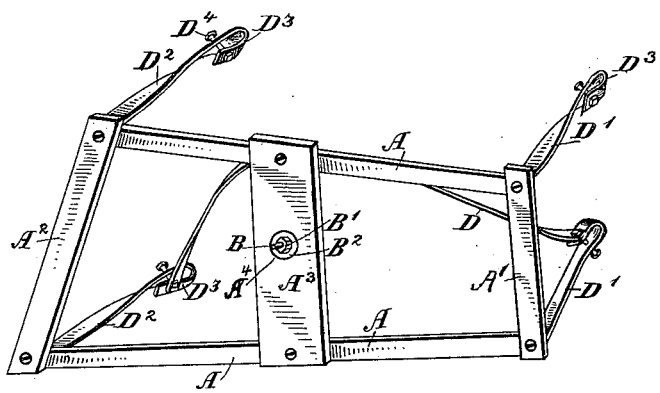

In the said drawings, Figure 1 is a perspective view of one-half of the duplex frame. Fig. 2 is a perspective view of the two frames coupled on a part of the frame of a bicycle.

In the drawings, A represent two polygonal-shaped frames, preferably made of wood. Each of these frames is so formed that the end piece A', which is intended as the forward or front end, is shorter than the rear end piece A². Both of these end pieces are deflected from a vertical line inwardly. The purpose of this deflection is to accommodate the frame to the frame of the bicycle. Centrally of this frame A there is fixed the center piece A³. In the drawings this is shown as a wooden cross-piece or support; but it is obvious that light metal or any other suitable material could be used both for this support as well as the other parts of the device. This support A³ has an opening A⁴ through it centrally. In the drawings this is shown round, but it may be elongated or any other shape, so that it will admit of the bolt B passing through it loosely. This bolt is the means by which the two frames A A are coupled together. It is provided with a thread and nuts B' upon one or both ends and also washers B², by means of which it is retained in place. The dotted lines C C in Fig. 2 show the possible excursions of the two frames when in use. It will be observed that the movement indicated is such a one as would be caused by the unequal vertical motion of two bicycles caused by any roughness of the roads.

Attached to one side of each frame A are the upper and lower braces—D' on the forward end of the frame and D² on the back or rear end of the same—the lower braces being reinforced by the cross-braces D D. These cross-braces D D are for strengthening and stiffening the frame. The leg-braces D' and D² are for the purpose of attaching the frame to the frame X X of the bicycle.

The braces D' and D² are four in number, each one terminating in a clamp D³. This clamp, as shown in Fig. 1, consists of a bend or crook on the end of the brace with a threaded hole therethrough, through which a threaded bolt D⁴ passes, and is the direct means by which the frame is secured to the frame of the bicycle.

The operation of this device is as follows: When it is desired to unite two bicycles, the two parts of the frame A are severally fixed to bicycles by clamping the arms D' and D² to the frames thereof, as shown in Fig. 2. When the two parts of the frame are so attached, the center parts A³ are brought together and the bolt B is passed through the hole B', the nut B² then screwed up snug, and the union of the two frames is complete.

It will be readily seen that by the use of this device for connecting bicycles a union is secured which, although firm and secure and admitting of practically no lateral movement of one bicycle independent of the other, will at the same time allow independent vertical movement in each sufficient to admit of its passing easily over any roughness in the road. The connecting-frames A also afford a convenient medium for the attachment of a child's seat or canopy, and a socket, as E, with set-screw E', may be provided thereon for the reception of the upright post of said seat or canopy.

While I have described the method and manner in which I proceed to construct my invention, it is obvious that many departures as to the details of construction may be made without deviating from the principles of my invention.

What I claim is—

1. A bicycle-connecting device comprising a plurality of frames each consisting of a central piece having a bolt passing therethrough, cross-pieces secured to each central piece on the outer side thereof, and extending beyond, and friction-pieces upon the inner sides of the frames; one of said frames adapted to be connected to each bicycle, parallel with the wheels thereof, by means of arms projecting from their extremities.

2. A bicycle-connecting device comprising a plurality of vertically-disposed frames each consisting of a central piece having a bolt passing therethrough, cross-pieces secured to each central piece on the outer side thereof and extending beyond, and friction-pieces upon the inner side of the frames; one of said frames adapted to be connected to each bicycle by means of arms projecting from their extremities having clamps on their outer ends adapted to be secured to the frame of the bicycle.

JOHN C. SCHLEICHER.

Witnesses:
E. F. BALLENTINE,
S. J. COX, Jr.